United States Patent
Eoff et al.

(10) Patent No.: US 9,562,423 B2
(45) Date of Patent: Feb. 7, 2017

(54) ACID DIVERSION TREATMENTS IN INJECTION WELLS USING PERMEABILITY MODIFIERS

(71) Applicant: Halliburton Energy Services, Inc., Houston, TX (US)

(72) Inventors: Larry Steven Eoff, Duncan, OK (US); B. Raghava Reddy, The Woodlands, TX (US); Eric Davidson, Aberdeen (GB); Alexandra Clare Morrison, Inverurie (ZA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/366,219

(22) PCT Filed: Aug. 27, 2013

(86) PCT No.: PCT/US2013/056726
§ 371 (c)(1),
(2) Date: Jun. 17, 2014

(87) PCT Pub. No.: WO2015/030721
PCT Pub. Date: Mar. 5, 2015

(65) Prior Publication Data
US 2015/0300140 A1 Oct. 22, 2015

(51) Int. Cl.
*E21B 33/13* (2006.01)
*E21B 43/16* (2006.01)
(Continued)

(52) U.S. Cl.
CPC ............... *E21B 43/162* (2013.01); *C09K 8/74* (2013.01); *C09K 8/78* (2013.01); *E21B 43/25* (2013.01)

(58) Field of Classification Search
CPC ........ E21B 33/13; E21B 43/295; E21B 43/00; E21B 43/25; E21B 43/16; E21B 43/27; E21B 29/10; E21B 33/138; E21B 43/162; C09K 8/60; C09K 8/74; C09K 8/68
(Continued)

(56) References Cited

U.S. PATENT DOCUMENTS 4,487,265 A * 12/1984 Watanabe ................ C09K 8/60
166/307
4,982,793 A 1/1991 Holtmyer et al.
(Continued)

FOREIGN PATENT DOCUMENTS

WO 2015030721 A1 3/2015

OTHER PUBLICATIONS

International Search Report and Written Opinion for PCT/US2013/056726 dated May 23, 2014.

*Primary Examiner* — Angela M DiTrani
*Assistant Examiner* — Ashish Varma
(74) *Attorney, Agent, or Firm* — McDermott Will & Emery LLP; Craig Roddy

(57) ABSTRACT

Some embodiments herein comprise providing a treatment fluid comprising an aqueous base fluid, an acid, a permeability modifier, and a permeability modifier deactivator; providing an injection well having a first treatment zone comprising a first aqueous formation permeability, wherein the first treatment zone comprises formation damage; introducing the treatment fluid into the injection well, so as to contact the acid, the permeability modifier, and the permeability modifier deactivator with the first treatment zone; reacting the acid with the first treatment zone so as to repair a portion of the formation damage; reacting the permeability modifier with the first treatment zone so as to cause the first
(Continued)

aqueous formation permeability to adopt a second, lesser aqueous formation permeability; and contacting the permeability modifier deactivator with the permeability modifier so as to deactivate the permeability modifier and restore the first treatment zone to about the first aqueous formation permeability.

16 Claims, 2 Drawing Sheets

(51) Int. Cl.
  *E21B 43/25* (2006.01)
  *C09K 8/74* (2006.01)
  *C09K 8/78* (2006.01)
(58) Field of Classification Search
  USPC ............................................................ 166/300
  See application file for complete search history.

(56) References Cited

U.S. PATENT DOCUMENTS

| | | | |
|---|---|---|---|
| 5,067,565 A | 11/1991 | Holtmyer et al. | |
| 5,122,549 A | 6/1992 | Holtmyer et al. | |
| 5,979,557 A * | 11/1999 | Card | C09K 8/68 166/281 |
| 6,207,771 B1 | 3/2001 | Larson | |
| 6,364,016 B1 | 4/2002 | Dalrymple et al. | |
| 6,476,169 B1 | 11/2002 | Eoff et al. | |
| 6,516,885 B1 | 2/2003 | Munday | |
| 7,114,568 B2 | 10/2006 | Eoff et al. | |
| 7,117,942 B2 | 10/2006 | Dalrymple et al. | |
| 7,182,136 B2 | 2/2007 | Dalrymple et al. | |
| 7,552,771 B2 | 6/2009 | Eoff et al. | |
| 7,563,750 B2 | 7/2009 | Eoff et al. | |
| 7,589,048 B2 | 9/2009 | Eoff et al. | |
| 7,595,283 B2 | 9/2009 | Eoff et al. | |
| 7,727,936 B2 | 6/2010 | Pauls et al. | |
| 7,759,292 B2 | 7/2010 | Eoff et al. | |
| 8,008,235 B2 | 8/2011 | Eoff et al. | |
| 8,273,692 B2 | 9/2012 | Eoff et al. | |
| 2005/0178549 A1* | 8/2005 | Eoff | C09K 8/508 166/295 |
| 2008/0110624 A1 | 5/2008 | Nguyen et al. | |
| 2010/0230106 A1 | 9/2010 | Milne et al. | |
| 2011/0034351 A1 | 2/2011 | Eoff et al. | |
| 2012/0168166 A1 | 7/2012 | Dalrymple et al. | |
| 2012/0231978 A1 | 9/2012 | Eoff et al. | |
| 2012/0264885 A1 | 10/2012 | Eoff et al. | |

* cited by examiner

ACID DIVERSION TREATMENTS IN INJECTION WELLS USING PERMEABILITY MODIFIERS

BACKGROUND

The methods of the embodiments described herein relate to acid diversion treatments in injection wells using permeability modifiers.

An injection well is a wellbore in subterranean formation used to pump fluids into a producing reservoir (e.g., a hydrocarbon producing reservoir). Injection wells are typically used for waterflood, pressure maintenance, and enhanced oil recovery purposes. Injection wells are often composed of multiple subterranean zonal portions that are not homogeneous in terms of permeability, porosity, and/or the degree of damage experienced in the particular zone compared to surrounding zones. These nonhomogeneous zones can impede fluid injectivity into producing wellbores and may require increased pressure to adequately inject fluids.

It is common to perform acid diversion treatments in injection wells to combat the nonhomogeneous nature of the well. An aqueous acid treatment may be injected into an injection well, where the acid is expected to dissolve portions of the formation rock in the near wellbore region, thereby reducing the lack of zonal homogeneity in the injection well. Acids, however, follow the path of least resistance and tend to flow to high permeability zones. In order to uniformly treat an injection well with an acid, diversion techniques are typically employed. Diversion techniques encourage the acid to flow from high permeability zones to low permeability zones.

Permeability modifiers have been effective acid diverters for hydrocarbon producing wells. They are capable of altering the relative permeability of a portion of a wellbore that they come into contact with, resulting in blockage of water production and/or diversion of aqueous fluids away from that portion of the wellbore. As such, they are particularly useful in hydrocarbon producing wells where they have no effect on hydrocarbon permeability and where there is no concern that the effects of the permeability modifier (e.g., reduction in water permeability) may remain in effect for a period longer than desired or permanently. Injection wells, on the other hand, typically involve injection of water rather than hydrocarbons and minimal pressure during fluid injection is desirable. Thus, the use of permeability modifiers, although effective acid diverters, in injection wells may result in undesirable or irreversible reduction in water permeability of the wellbore.

It is therefore desirable to provide an acid diversion treatment for use in an injection well comprising a permeability modifier, whose effects can be reversed after the treatment is complete.

BRIEF DESCRIPTION OF THE DRAWINGS

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
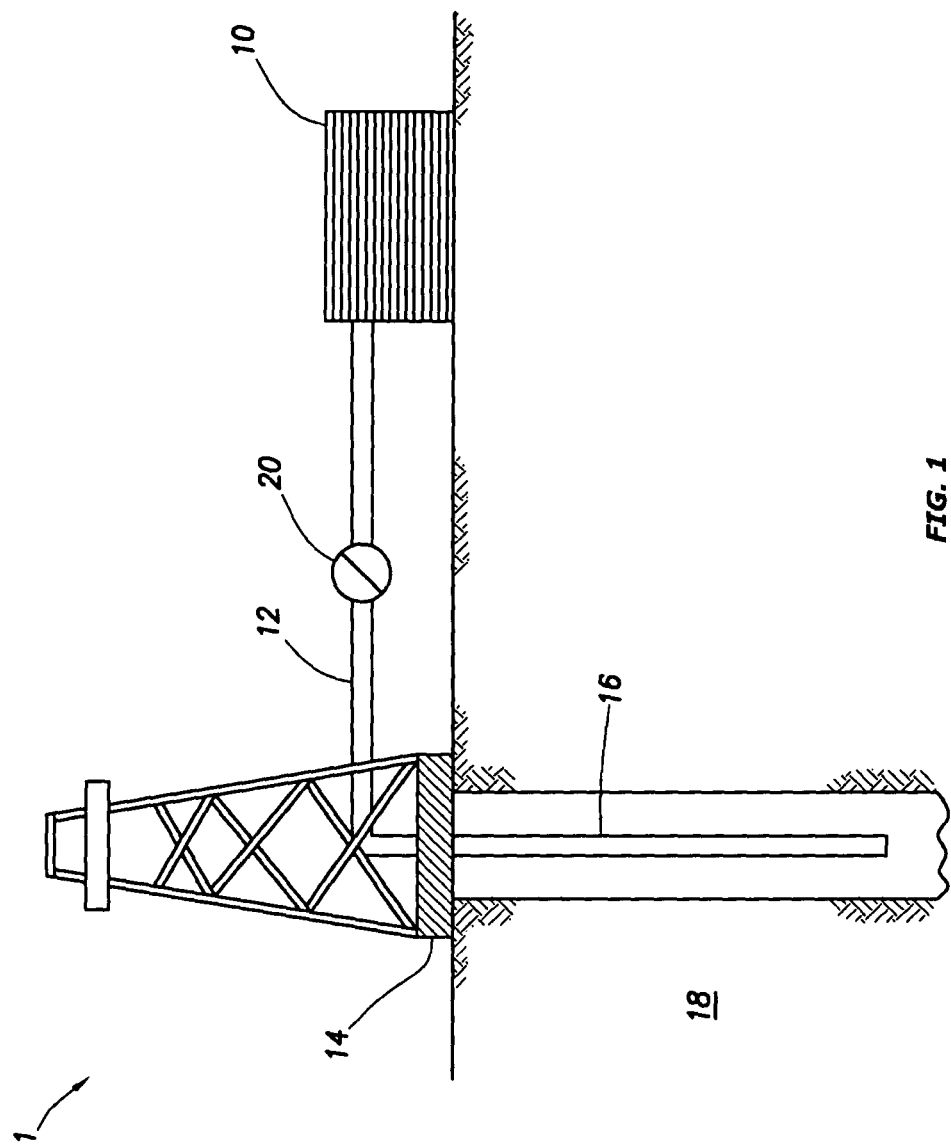
FIG. 1 depicts an embodiment of a system configured for delivering the treatment fluids comprising the acid diversion compositions described in some embodiments herein to a downhole location.

The methods of the embodiments described herein relate to acid diversion treatments in injection wells using permeability modifiers.

Although the embodiments disclosed herein focus on providing treatment fluids for use in acid diversion treatments in injection wells, the treatment fluids may be effectively used in any other subterranean formation or subterranean formation treatment operation that may benefit from an acid diversion treatment with reversible permeability modification effects. Such formations may include, but are not limited to, hydrocarbon producing wells, gas producing wells, and the like. Such subterranean formation treatment operations may include acid-fracturing treatments, remedial treatments, completion treatments, and the like. Additionally, although the treatment fluids described herein relate to acid diversion treatments, they may also be used without the acid for other diverting subterranean treatment operations.

One or more illustrative embodiments are presented below. Not all features of an actual implementation are described or shown in this application for the sake of clarity. It is understood that in the development of an actual embodiment, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described in terms of "comprising" various components or steps, the compositions and methods can also "consist essentially of" or "consist of" the various components and steps. When "comprising" is used in a claim, it is open-ended.

In some embodiments described herein, a method is provided comprising introducing a treatment fluid comprising an aqueous base fluid, an acid, and a permeability modifier into an injection well at a first treatment zone. In some embodiments, the treatment fluid may further comprise a permeability modifier deactivator, whereas in other embodiments the permeability modifier deactivator may be included in a later-placed fluid. The first treatment zone is characterized by a first aqueous formation permeability and comprises formation damage thereon (e.g., formation fines, other particulates, and the like). As used herein, the term "aqueous formation permeability" refers to the ability of a subterranean formation to transmit aqueous fluids, which may include aqueous fluids comprising acids for acid diversion treatments. As used herein, the term "formation damage" refers to undesirable deposits in a subterranean formation that may reduce its permeability (e.g., scale, skin, hydrates, geological deposits on the pore throats of the formation, and the like).

The acid in the treatment fluid is reacted with the formation at the first treatment zone so as to repair a portion of the formation damage in the first treatment zone, thereby increasing the overall permeability. The permeability modifier is reacted with the first treatment zone so as to cause the first aqueous formation permeability to decrease and adopt a second aqueous formation permeability. Thus, the permeability modifier is capable of reducing the water permeability of the first treatment zone. The permeability modifier deactivator and the permeability modifier are then contacted at the first treatment zone so as to deactivate the permeability modifier and restore first treatment zone to about the first aqueous formation permeability. After deactivation, the treatment fluid and any particulates formed as a result of repairing the formation damage may be removed from the injection well. In other embodiments, the acid and the permeability modifier are first introduced into the injection well in a first treatment fluid, so as to acidize and reduce the aqueous permeability of the first treatment zone, followed by introduction of a second treatment fluid comprising the permeability modifier deactivator. This provides methods wherein as a first treatment zone is exposed to an acid to remove formation damage (and thus increase the overall permeability that first treatment zone) the first treatment zone is simultaneously exposed to a permeability modifier that acts over time to reduce the aqueous permeability of the first treatment zone. In this way, as the treatment progresses, the first treatment zone will become gradually less permeable to the treatment fluid (which is itself aqueous based) and so may tend to self-divert the treatment fluid (containing the acid and the permeability modifier and the optional permeability modifier deactivator) to a second or subsequent treatment zone. The process of treating zonal portions of the injection well may be repeated in multiple zones.

The acid for use in the treatment fluids of the embodiments described herein may include any acid capable of removing formation damage from a subterranean formation, provided the acid does not adversely affect the function of the permeability modifier and permeability modifier deactivator in the treatment fluid. Examples of suitable acids include, but are not limited to, hydrochloric acid; hydrofluoric acid; acetic acid; formic acid; sulfuric acid; sulfamic acid; chloroacetic acid; nitric acid; phosphoric acid; tartaric acid; oxalic acid; lactic acid; glycolicaminopolycarboxylic acid; acid; polyaminopolycarboxylic acid; citric acid; ethylene diamine tetra acetic acid; and any combination thereof. In some embodiments, hydrochloric acid, acetic acid; and formic acid are preferred. In some embodiments, the acid may be present in the treatment fluid in the range of from about a lower amount in the range of from about 0.5%, 1%, 3%, 5%, 8%, 12%, and 15% to about an upper limit of 30%, 28%, 25%, 21%, 18%, and 15% by weight of the treatment fluid.

As used herein, the term "permeability modifier" refers to a material capable of reducing the permeability of a subterranean formation to aqueous fluids. In some embodiments, the permeability modifier preferably adsorbs to surfaces within the porosity of the subterranean formation, thereby resisting the flow of aqueous fluids thereon. The permeability modifier thus allows the aqueous treatment fluid described herein to be diverted past the first treatment zone after it has been acidized and to flow to a second treatment zone, if desired, for contact with the acid, permeability modifier, and permeability modifier deactivator. The process of treating zonal portions of the injection well may be repeated in multiple zones. Suitable permeability modifiers include, but are not limited to, an unmodified water-soluble polymer; a water-soluble hydrophobically modified polymer; a water-soluble hydrophilically modified polymer; and any combination thereof.

One of ordinary skill in the art will appreciate that a variety of different water-soluble polymers may be suitable for use as the permeability modifiers disclosed herein. In some embodiments, the water-soluble polymers may be formed by a polymerization reaction of water-soluble monomers. Suitable examples of water-soluble polymers include, but are not limited to, homo-, co-, and terpolymers of: acrylamide; alkyl acrylate; 2-acrylamido-2-methyl propane sulfonic acid; N,N-dimethylacrylamide; vinyl pyrrolidone; dimethylaminoethyl methacrylate; acrylic acid; dimethylaminopropyl methacrylamide; vinyl amine; vinyl alcohol; vinyl acetate; trimethylammoniumethyl methacrylate chloride; methacrylamide; hydroxyethyl acrylate; vinyl sulfonic acid; vinyl phosphonic acid; methacrylic acid; vinyl caprolactam; N-vinylformamide; N,N-diallylacetamide; dimethyldiallyl ammonium halide; itaconic acid; styrene sulfonic acid; methacrylamidoethyltrimethyl ammonium halide; quaternary ammonium salt derivatives of acrylamide; quaternary ammonium salt derivatives of acrylic acid; cellulose; chitosan; a polyamide; a polyetheramine; a polyethyleneimine; a polyhydroxyetheramine; a lysine; a polysulfone; a gum; a starch; any derivative thereof; and any combinations thereof. Any monomer used to synthesize these polymers may be used in synthesizing the water-soluble polymers disclosed herein. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. Where the water-soluble polymer is a starch, it may preferably be a cationic starch formed by reacting the starch (e.g., corn, maize, waxy maize, potato, tapioca, and the like) with the reaction product of epichlorohydrin and trialkylamine.

Specific examples of water-soluble polymers for use as the permeability modifiers described in some embodiments herein include, but are not limited to, polyacrylamide; polyvinylamine; poly(vinylamine/vinyl alcohol) copolymer; polydimethylaminoethyl methacrylate; polydimethylaminopropyl methacrylamide; poly(acrylamide/dimethylaminoethyl methacrylate) copolymer; poly(methacrylic acid/dimethylaminoethyl methacrylate) copolymer; poly(2-acrylamido-2-methyl propane sulfonic acid/dimethylaminoethyl methacrylate) copolymer; poly(acrylamide/dimethylaminopropyl methacrylamide)

copolymer; poly(acrylic acid/dimethylaminopropyl methacrylamide) copolymer; poly(methacrylic acid/di methylaminopropyl methacrylamide); any derivative thereof; and any combinations thereof.

In some embodiments, water-soluble hydrophobically modified polymers may by suitable for use as the permeability modifier described herein. As described herein, the term "hydrophobically modified" in all of its variations (e.g., "hydrophobic modification") refers to the incorporation into a water-soluble polymer structure hydrophobic groups having an alkyl chain length of about 4 to about 22 carbons. Although hydrophobic groups are incorporated into the polymer structure, the water-soluble hydrophobic modified polymers remain soluble in aqueous fluids. In some embodiments, a mole ratio of a water-soluble monomer to the hydrophobic groups in the water-soluble hydrophobically modified polymer is in the range of from about 99.98:0.02 to about 90:10. In certain embodiments, the water-soluble hydrophobically modified polymer may comprise a polymer backbone that comprises polar heteroatoms. Generally, the polar heteroatoms present within the polymer backbone of the water-soluble hydrophobically modified polymers include, but are not limited to, oxygen, nitrogen, sulfur, or phosphorous.

Exemplary water-soluble hydrophobically modified polymers may contain a water-soluble polymer backbone and a hydrophobic group, such as a hydrophobic branched alkyl chain of about 4 to about 22 carbons. In certain exemplary embodiments, the hydrophobic branch may have an alkyl chain length of about 7 to about 22 carbons. In other exemplary embodiments, the hydrophobic branch may have an alkyl chain length of about 12 to about 18 carbons.

Suitable examples of water-soluble hydrophobically modified polymers that may be utilized in the embodiments disclosed herein include, but are not limited to, acrylamide/octadecyldimethylammoniumethyl methacrylate bromide copolymer; dimethylaminoethyl methacrylate/vinyl pyrrolidone/hexadecyldimethylammoniumethyl methacrylate bromide terpolymer; acrylamide/2-acrylamido-2-methyl propane sulfonic acid/2-ethylhexyl methacrylate terpolymer; alkylamino alkylene methacrylate/alkyl ammonium alkylene methacrylate copolymer (e.g., dimethlyaminoethyl methacrylate/alkyl-dimethylammoniumethyl methacrylate copolymer and di methylaminoethyl methacrylate/hexadecyldimethylammoniumethyl methacrylate copolymer); any derivative thereof; and any combinations thereof. As discussed in more detail below, these water-soluble hydrophobically modified polymers may be formed, in exemplary embodiments, by reactions with a variety of alkyl halides. For example, in some exemplary embodiments, the water-soluble hydrophobically modified polymer may comprise a dimethylminoethyl methacrylate/hexadecyldimethylammoniumethyl methacrylate bromide copolymer.

The water-soluble hydrophobically modified polymers described herein may be synthesized by any suitable technique known in the art. In some embodiments, the water-soluble hydrophobically modified polymers may be formed by the reaction product of one or more water-soluble polymers and one or more hydrophobic groups. In other embodiments, the water-soluble hydrophobically modified polymers may be prepared from a polymerization reaction of water-soluble monomers, followed by hydrophobic modification of the resultant polymer. In still other embodiments, hydrophobic groups may be reacted with water-soluble monomers that are then polymerized to form the water-soluble hydrophobically modified polymers disclosed herein. In yet other embodiments, the water-soluble hydrophobically modified polymers may be formed by the polymerization reaction of hydrophobically modified water-soluble monomers and water-soluble monomers. One of skill in the art, with the benefit of this disclosure, will recognize what method of synthesis to choose based on a particular application. Factors that may influence the type of synthesis selected include, but are not limited to, reaction conditions, the type of starting material (e.g., water-soluble monomers v. water-soluble polymers) available, and the like.

Water-soluble polymers that may be used for forming the water-soluble hydrophobically modified polymers disclosed herein may be any of the water-soluble polymers and their derivatives that may be alone used as permeability modifiers, as discussed above. In some embodiments, the water-soluble polymer selected may preferably comprise reactive amino groups in the polymer backbone or as pendent groups, which may be capable of reacting with hydrophobic groups. In some exemplary embodiments, the amino groups are dialkyl amino pendent groups. In some exemplary embodiments, the water-soluble hydrophobically modified polymers are formed from monomers comprising dimethylaminoethyl methacrylate or dimethylaminopropyl methacrylamide, with hydrophobic dimethyl amino pendant groups.

The hydrophobic groups that are capable of reacting with the water-soluble polymers to form the water-soluble hydrophobically modified polymers for use as permeability modifiers include, but are not limited to, an alkyl halide; a sulfonate; a sulfate; a hydrophobic organic acid; any derivative thereof; and any combinations thereof. Suitable examples of hydrophobic organic acids and organic acid derivatives may include, but are not limited to, octenyl succinic acid; dodecenyl succinic acid; anhydrides, esters, imides, and amides thereof; and any combination thereof.

As discussed, in some embodiments, the water-soluble hydrophobically modified polymers may be prepared from the polymerization reaction of hydrophobically modified water-soluble monomers and water-soluble monomers. In such cases, the polymerization reactions may have estimated molecular weights in the range of from a lower limit of about 100,000; 250,000; 500,000; 750,000; 1,000,000; 1,250,000; 1,500,000; 1,750,000; 2,000,000; 2,250,000; 2,500,000; 2,750,000; 3,000,000; 3,250,000; 3,500,000; 3,750,000; 4,000,000; 4,250,000; 4,500,000; 4,750,000; and 5,000,000 to an upper limit of about 10,000,000; 9,750,000; 9,500,000; 9,250,000; 9,000,000; 8,750,000; 8,500,000; 8,250,000; 8,000,000; 7,750,000; 7,500,000; 7,250,000; 7,000,000; 6,750,000; 6,500,000; 6,250,000; 6,000,000; 5,750,000; 5,500,000; 5,250,000; and 5,000,000. In some embodiments, the mole ratios of the water-soluble monomer(s) to the hydrophobically modified water-soluble monomer(s) in the range of from about 99.98:0.02; 98.08:0.92; 98.18:1.82; 97.28:2.72; 96.38:3.62; 95.48:4.52; 94.58:5.42; 93.68:6.32; 92.78:7.22; 97.88:8.12; 90.98:9.02; to about 90:10. Suitable water-soluble monomers that may be used to synthesize the water-soluble hydrophobically modified polymers (i.e., both the water-soluble non-hydrophobically modified monomers and the hydrophobically modified water-soluble monomers) include any of those listed for forming the water-soluble polymers, as discussed previously. Examples of hydrophobically modified water-soluble polymers may include, but are not limited to, alkyl acrylates; alkyl methacrylates; alkyl acrylamides; alkyl methacrylamides alkyl dimethylammoniumethyl methacrylate halides; alkyl dimethylammoniumpropyl methacrylamide halidesoctadecyldimethylammoniumethyl methacrylate bromide;

hexadecyldimethylammoniumethyl methacrylate bromide; hexadecyldimethylammoniumpropyl methacrylamide bromide; 2-ethylhexyl methacrylate; hexadecyl methacrylamide; and any combination thereof, wherein the alkyl groups have from about 4 to about 22 carbon atoms.

In some embodiments, water-soluble hydrophilically modified polymers may be used as the permeability modifiers described herein. As used herein, the term "hydrophilically modified" in all of its variations (e.g., "hydrophilic modification") refers to the incorporation of hydrophilic groups into a water-soluble polymer structure. In exemplary embodiments, the hydrophilic groups are branched to increase the degree of branching of the water-soluble polymer. The water-soluble hydrophilically modified polymers typically have molecular weights in the range of from about 100,000 to about 10,000,000 and may have weight ratios of the hydrophilic polymers to the polyethers in the range of from about 1:1; 1.5:1; 2:1; 2.5:1; 3:1; 3.5:1; 4:1; 4.5:1; 5:1; 5.5:1; 6:1; 6.5:1; 7:1; 7.5:1; 8:1; 8.5:1; 9:1; 9.5:1; to about 10:1. In certain embodiments, the water-soluble hydrophilically modified polymers comprise a polymer backbone, the polymer backbone comprising polar heteroatoms including, but not limited to, oxygen, nitrogen, sulfur, or phosphorous.

Specific examples of suitable water-soluble hydrophilically modified polymers include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; the reaction product of poly(acrylamide/dimethylaminopropyl methacrylamide) and epichlorohydrin-terminated polyethyleneoxide methyl ether; the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1; any derivative thereof; and any combinations thereof.

The water-soluble hydrophilically modified polymers described herein may be synthesized by any suitable technique known in the art. In some embodiments, the water-soluble hydrophilically modified polymers may be formed by the reaction product of one or more water-soluble polymers and compounds comprising one or more hydrophilic groups. In other embodiments, the water-soluble hydrophilically modified polymers may be prepared from a polymerization reaction of water-soluble monomers, followed by hydrophilic modification of the resultant polymer. In still other embodiments, compounds comprising hydrophilic groups may be reacted with water-soluble monomers that are then polymerized to form the water-soluble hydrophilically modified polymers disclosed herein. In yet other embodiments, the water-soluble hydrophilically modified polymers may be formed by the polymerization reaction of hydrophilically modified water-soluble monomers and water-soluble monomers. One of skill in the art, with the benefit of this disclosure, will recognize what method of synthesis to choose based on a particular application. Factors that may influence the type of synthesis selected include, but are not limited to, reaction conditions, the type of starting material (e.g., water-soluble monomers v. water-soluble polymers) available, the desired degree of branching, and the like. In all cases, suitable water-soluble polymers and monomers for use in forming the water-soluble hydrophilically modified polymers described herein include any of the water-soluble polymers and monomers and their derivatives that may be alone used as permeability modifiers, as discussed above.

Suitable hydrophilic groups that may be present in a hydrophilic compound may include, but are not limited to, a hydroxyl group; a carbonyl group; a carboxyl group; a sulfhydryl group; an amino group; a phosphate group; a polyether group; any derivative thereof; and any combination thereof. Preferably, if a polyether group is used for hydrophilic modification, it also comprises a halogen; sulfonate; sulfate; organic acid; epichlorohydrin-terminated polyethylene oxide methyl ether; or a derivative thereof. Suitable polyether groups include, but are not limited to, polyethylene oxide; polypropylene oxide; polybutylene oxide; copolymers thereof; terpolymers thereof; and any combination thereof.

In some embodiments, the permeability modifier is present in the range of from a lower limit of from about 0.05%, 0.1%, 0.5%, 1%, 1.5%, and 2% to an upper limit of from about 5%, 4.5%, 4%, 3.5%, 3%, and 2.5% by weight of the treatment fluid. The permeability modifier disclosed in some embodiments may reduce the permeability of a subterranean formation in the range of from a lower limit of about 45%; 47.5%; 50%; 52.5%; 55%; 57.5%; 60%; 62.5%; 65%; and 67.5% to an upper limit of about 90%; 87.5%; 85%; 82.5%; 80%; 77.5%; 75%; 72.5%; 70%; and 67.5% from a first aqueous formation permeability to a second aqueous formation permeability upon contact with the subterranean formation.

The permeability modifier deactivator in the exemplary embodiments herein is capable of deactivating the permeability modifier and reversing its effects. That is, the permeability modifier deactivator is able to restore a subterranean formation treated with the permeability modifier (i.e., experiencing a reduced permeability to water due to contact with the permeability modifier) back to approximately the original untreated aqueous permeability (i.e., before exposure to the permeability modifier. As such, the exemplary acid diverting qualities of the permeability modifier may be used in an injection well without the well experiencing substantial adverse permeability reduction. In some embodiments, the permeability modifier deactivator may be included in the same treatment fluid as the permeability modifier without effecting the action of the permeability modifier, at least during the acid diversion treatment operation. That is, the permeability modifier deactivator can be designed to deactivate the permeability modifier at varying degrees of degradation and at variable durations and rates, thereby allowing the acid and permeability modifier to perform their functions prior to deactivation and restoration of the formations permeability to water, according to the needs of the operator. Indeed, in some embodiments, it is possible to shut in the injection well after introducing the treatment fluids described herein comprising an aqueous base fluid, an acid, a permeability modifier, and a permeability modifier deactivator for a substantial period of time, such as over a week. Generally, however, shut-in times may be no more than about 24 hours. In other embodiments, the permeability modifier and permeability modifier deactivator may be introduced into the formation in separate treatment fluids.

In some embodiments, the permeability modifier deactivator may deactivate the permeability modifier by a mechanism selected from the group consisting of desorption of the permeability modifier; degradation of the permeability modifier; blocking hydrophobic functional groups present on the permeability modifier (e.g., blocking the hydrophobic functional groups from forming intermolecular or intramolecular hydrophobic associations); and any combination thereof. The permeability modifier deactivators that are capable of blocking hydrophobic functional groups may function by incorporating the hydrophobic functional groups on the permeability modifier into the micellar structures of the permeability modifier deactivator, thereby preventing the hydrophobic functional groups from association with similar groups on the permeability modifier or on other permeability modifiers. As used herein, the term "desorption" in all of its variants (e.g., "desorbed," "desorbing," and the like) refers to the disassociation of an adsorbed substance from the substrate to which it was adsorbed. As used herein, the term "degradation" in all of its variants (e.g., "degrade," "degradable," and the like) refers to lowering of a molecular weight to a less effective level. The term "deactivation" of the permeability modifier by the permeability modifier deactivator is not intended to imply 100% deactivation, but to a sufficient extent to return the original permeability (e.g., to restore the first treatment zone to about the first aqueous formation permeability) within a range of, for example, from a lower limit of about 20%; 25%; 30%; 35%; 40%; 45%; and 50% to an upper limit of about 100%; 95%; 90%; 85%; 80%; 75%; 70%; 65%; 60%; 55%; and 50%.

The permeability modifier deactivator may include, but is not limited to, a free-radical generating compound (also referred to herein as "FRGC"); a mutual solvent; a surfactant; and any combination thereof. FRGCs may promote, among other things, the desorption and oxidation of the permeability modifiers disclosed herein (e.g., promote the removal of the permeability modifier from the pores of the subterranean formation). Mutual solvents and surfactants may interfere with the hydrophobic functional groups that act to maintain the placement of the permeability modifier (e.g., couple the hydrophobic groups with the aqueous base fluid), and at certain elevated concentrations, surfactants may desorb the permeability modifier itself.

Suitable examples of FRGC include, but are not limited an inorganic oxidizer compound; an organic peroxide; an azo compound; and any combination thereof. Suitable examples of inorganic oxidizer compounds that may be used as the FRGCs of some embodiments disclosed herein may include, but are not limited to, a hydrogen peroxide; an alkali metal persulfate; an alkali metal perborate; an alkali metal chlorite; an alkali metal bromate; an alkali metal chlorate; an alkali metal hypochlorite; an alkali metal permanganate; an oxidation-reduction system employing a reducing agent (e.g., a sulfite) in combination with an oxidizer; ammonium persulfate; potassium persulfate; sodium persulfate; and any combination thereof. An example of a suitable commercially available inorganic oxidizer compound includes, but is not limited to VICON NF™, available from Halliburton Energy Services, Inc. in Houston, Tex. Suitable examples of organic peroxides that may be used as the FRGCs of some embodiments disclosed herein may include, but are not limited to, a hydroperoxide; a dialkyl peroxide; benzoyl peroxide; 2,2-bis(tert-butylperoxy)butane; 2,4-pentanedione peroxide; 2,5-di(tert-butylperoxy)-2,5-dimethyl-3-hexyne; 2-butanone peroxide; cumene hydroperoxide; di-tert-amyl peroxide; dicumyl peroxide; lauroyl peroxide; tert-butyl hydroperoxide; tert-butyl peracetate; tert-butyl peroxide; tert-butyl peroxybenzoate; tert-butylperoxy-2-ethylhexyl carbonate; and any combination thereof. In some embodiments, the organic peroxide has a water solubility of greater than about 5%. Suitable examples of azo compounds that may be used as the FRGCs of some embodiments disclosed herein may include, but are not limited to, 2'-azobis-(2-methylbutyronitrile); 2,2'-azobis(isobutyramidine hydrochloride); 2,2'-azobis[2-(2-imidazolin-2-yl)propane]dihydrochloride; 1,1'-azobis(cyclohexanecarbonitrile); 2,2'-azobis(2-methylpropionamidine)dihydrochloride; 4,4'-azobis(4-cyano valeric acid); 2,2-azobis(2-methyl-N-(2-hydroxyethyl)propionamide; and any combination thereof. In some embodiments, the azo compounds are water-soluble with a minimum solubility of greater than about 5%. A suitable commercially available azo compound includes, but is not limited, to PERM C™ available from Halliburton Energy Services, Inc. in Houston, Tex.

Suitable mutual solvents for use in the treatment fluids described herein include, but are not limited to, glycol ethers and alkoxylates of glycol ethers. Specific examples of suitable mutual solvents may include, but are not limited to, ethylene glycol monomethyl ether; ethylene glycol monoethyl ether; ethylene glycol monopropyl ether; ethylene glycol monoisopropyl ether; ethylene glycol monobutyl ether ("EGMBE"); ethylene glycol monophenyl ether; ethylene glycol monobenzyl ether; ethylene glycol monohexyl ether; propylene glycol monobutyl ether; diethylene glycol monomethyl ether; diethylene glycol monoethyl ether; diethylene glycol monobutyl ether; diethylene glycol monohexyl ether; diethylene glycol dimethyl ether; dipropylene glycol methyl ether; triethylene glycol monomethyl ether; triethylene glycol monoethyl ether; triethylene glycol monobutyl ether; any derivative thereof; and any combination thereof. Suitable commercially available mutual solvents include, but are not limited to, MUSOL® A Mutual Solvent and MUSOL® E Mutual Solvent, available from Halliburton Energy Services, Inc. in Houston, Tex.

Suitable surfactants for use as the permeability modifier deactivators in some embodiments described herein include, but are not limited to, nonionic, anionic, cationic, and zwitterionic surfactants. Specific examples may include, but are not limited to, an alkyl sulfonates; alkyl aryl sulfonate (e.g., an alkyl benzyl sulfonate, such as a salt of dodecylbenzene sulfonic acid); alkyl trimethylammonium chloride; a branched alkyl ethoxylated alcohol; dioctyl sodium sulfosuccinate; linear alkyl ethoxylated alcohol; trialkyl benzylammonium chloride; a sulfated alkoxylate (e.g., sodium dodecylsulfate); a sulfonated alkoxylate; an alkyl quaternary ammonium compound (e.g., trimethyl hexadecyl ammonium bromide); an alkoxylated linear alcohol; $C_{10}$-$C_{20}$ alkyldiphenyl ether sulfonate; polyethylene glycol; an ether of alkylated phenol; an alpha olefin sulfonate (e.g., sodium dodecene sulfonate); any derivative thereof; and any combination thereof.

In some embodiments, the permeability modifier deactivators may be present in the treatment fluid in the amount in the range of from a lower limit of about 0.0001%; 0.001%; 0.01%; 0.1%; 1%; 10%; 20%; 30%; 40%; 50%; 60%; 70%; 80%; 90%; and 100% to an upper limit of about 200%; 190%; 180%; 170%; 160%; 150%; 140%; 130%; 120%; 110%; and 100% by weight of the permeability modifier. In other embodiments, the permeability modifier deactivators may be present in the range of from about 1% to about 150% by weight of the permeability modifier. In yet other embodiments, the permeability modifier deactivators may be present in the range of from about 10% to about 100% by weight of the permeability modifier. One of ordinary skill in the art, with the benefit of this disclosure, will recognize and optimize the amount of permeability modifier deactivator to include in a particular treatment fluid. Factors that may affect the amount of permeability modifier deactivator to include in a treatment fluid may include, but are not limited to, the type of permeability modifier selected, the type of permeability modifier deactivator selected, the duration of time before deactivation of the permeability modifier is desired, and the like.

In various embodiments, systems configured for delivering the treatment fluids described herein to a downhole location are described. In various embodiments, the systems can comprise a pump fluidly coupled to a tubular, the tubular containing a treatment fluid comprising the permeability modifier and/or the permeability modifier deactivator.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid disclosed in some embodiments herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: (a) providing a treatment fluid comprising an aqueous base fluid, an acid, a permeability modifier, and a permeability modifier deactivator; (b) providing an injection well in a subterranean formation having a first treatment zone comprising a first aqueous formation permeability, wherein first treatment zone comprises formation damage; (c) introducing the treatment fluid into the injection well, so as to contact the acid, the permeability modifier, and the permeability modifier deactivator with the first treatment zone; (d) reacting the acid with the first treatment zone so as to repair a portion of the formation damage; (e) reacting the permeability modifier with the first treatment zone so as to cause the first aqueous formation permeability in the first treatment zone to adopt a second aqueous formation permeability that is less than the first aqueous formation permeability; (f) contacting the permeability modifier deactivator with the permeability modifier at the first treatment zone so as to deactivate the permeability modifier and restore the first treatment zone to about the first aqueous formation permeability; and (g) removing the treatment fluid from the injection well.

B. method comprising: (a) providing a first treatment fluid comprising an aqueous base fluid, an acid, and a permeability modifier; (b) providing a second treatment fluid comprising an aqueous base fluid and a permeability modifier deactivator; (b) providing an injection well in a subterranean formation having a first treatment zone comprising a first aqueous formation permeability, wherein the first treatment zone comprises formation damage; (c) introducing the first treatment fluid into the injection well, so as to contact the acid and the permeability modifier with the first treatment zone; (d) reacting the acid with the first treatment zone so as to repair a portion of the formation damage; (e) reacting the permeability modifier with the first treatment zone so as to cause the first aqueous formation permeability in the first treatment zone to adopt a second aqueous formation permeability that is less than the first aqueous formation permeability; (f) introducing the second treatment fluid into the injection well, so as to contact the permeability modifier deactivator with the first treatment zone; (g) contacting the permeability modifier deactivator with the permeability modifier at the first treatment zone so as to deactivate the permeability modifier and restore first treatment zone to about the first aqueous formation permeability; and (g) removing the treatment fluid from the injection well.

Each of embodiments A and B may have one or more of the following additional elements in any combination:

Element 1: Wherein elements (a) through (f) are repeated at at least a second treatment zone in the injection well.

Element 2: Wherein elements (a) through (g) are repeated at at least a second treatment zone in the injection well.

Element 3: Wherein the second aqueous formation permeability is in the range of about 50% to about 90% less than the first aqueous formation permeability.

Element 4: Wherein the permeability modifier deactivator deactivates the permeability modifier by a mechanism selected from the group consisting of desorption of the permeability modifier; degradation of the permeability modifier; blocking hydrophobic functional groups present on the permeability modifier; and any combination thereof.

Element 5: Wherein the permeability modifier is an unmodified water-soluble polymer; a water-soluble hydrophobically modified polymer; a water-soluble hydrophilically modified polymer; and any combination thereof.

Element 6: Wherein the permeability modifier is present in an amount in the range of from about 0.05% to about 5% by weight of the treatment fluid.

Element 7: Wherein the acid is selected from the group consisting of hydrochloric acid; hydrofluoric acid; acetic acid; formic acid; sulfuric acid; sulfamic acid; chloroacetic acid; nitric acid; phosphoric acid; tartaric acid; oxalic acid; lactic acid; glycolic acid; aminopolycarboxylic acid; polyaminopolycarboxylic acid; citric acid; ethylene diamine tetra acetic acid; and any combination thereof.

Element 8: Wherein the acid is present in an amount in the range of from about 0.5% to about 8% by weight of the treatment fluid.

Element 9: Wherein the permeability modifier deactivator is selected from the group consisting of a free-radical generating compound; a mutual solvent; a surfactant; and any combination thereof.

Element 10: Wherein the permeability modifier deactivator is present in an amount in the range of from about 0.0001% to about 200% by weight of the permeability modifier.

Element 11: Wherein the permeability modifier deactivator that restores the first treatment zone to about the first aqueous formation permeability achieves a restoration of at least about 20% of the first aqueous formation permeability.

By way of non-limiting example, exemplary combinations applicable to A, B, C include: A in combination with 3, 10, and 11; A in combination with 1, 3, 5, and 7; B in combination with 5, 6, 7, and 11; and B in combination with 2, 3, 8, 9, and 10.

To facilitate a better understanding of the embodiments described herein, the following examples of preferred or representative embodiments are given. In no way should the following examples be read to limit, or to define, the scope of the disclosure.

EXAMPLE 1

In one example, a core flow test was performed to evaluate the performance of the permeability modifier when it is present in a single treatment fluid with a permeability modifier deactivator. A treatment fluid was prepared according to some embodiments described herein using 6.7 mL of a 3% active solution of a hydrophobically modified dimethylaminoethyl methacrylate permeability modifier, 2.5 mL of a 10% active solution of a sodium chlorate permeability modifier deactivator, and 90.8 mL of 2% KCl. 56 mL of the treatment fluid was pumped into a 2.56 cm×15.24 cm (1 in×6 in) sandstone core, having an initial permeability to brine (9% NaCl/1% $CaCl_2$) of about 4,700 millidarcy ("mD"). Pressure increases were observed by means of pressure transducers connected to the flow system. Immediately thereafter, the core was flushed with a brine solution (9% NaCl/1% $CaCl_2$) and a reduction in brine permeability of about 98% was observed due to the action of the dimethylaminoethyl methacrylate permeability modifier, without hindrance from the sodium chlorate permeability modifier deactivator. This example illustrates that when the treatment fluid comprises a permeability modifier as well as a permeability modifier deactivator, sufficient time is available for the permeability modifier to reduce the permeability of a subterranean formation prior to the action of the permeability modifier deactivator.

EXAMPLE 2

In this example, a core flow test was performed to evaluate the ability of a permeability modifier deactivator to remove the permeability reduction brought about by the permeability modifier. A treatment fluid was prepared according to some embodiments described herein using 6.7 mL of a 3% active solution of a hydrophobically modified dimethylaminoethyl methacrylate permeability modifier, 1.0 g of sodium persulfate free-radical generating compound, 0.6 g sodium carbonate pH control agent, and 93.7 mL of 2% KCl. 19 mL of the treatment fluid was pumped into a 2.56 cm×15.24 cm (1 in×6 in) sandstone core, having an initial permeability to brine (9% NaCl/1% CaCl2) of about 1650 mD. Pressure increases were observed by means of pressure transducers connected to the flow system. Immediately thereafter, the core was shut-in for 10 minutes. Following this shut-in period brine (9% NaCl/1% CaCl2) was again pumped through the core and reduction in permeability to brine of about 94% was seen, illustrating that the permeability modifier deactivator had not removed the effect of the permeability modifier. Following this, the treatment fluid was again pumped into the core, followed by a shut-in time of 1 hour. After the shut-in period, brine (9% NaCl/1% CaCl2) was again pumped into the core and reduction in permeability to brine of about 17% was seen, indicating that the permeability modifier deactivator was able to reverse the permeability reduction of the core by the permeability modifier. This example illustrates that with the proper combination selection of the permeability modifier and the permeability modifier deactivator and, in this example, an adequate shut-in period, the effect of the permeability modifier can be reduced significantly.

EXAMPLE 3

In this example, a core flow test was performed to evaluate the performance of the permeability modifier deactivator described in some embodiments herein to restore permeability after treatment with the permeability modifier. A first treatment fluid was prepared using 6.7% of a hydrophobically modified dimethylaminoethyl methacrylate permeability modifier in 1.25 sg of NaBr brine solution buffered at approximately pH 5.2. The first treatment fluid was flowed at 100 psi through four separate 10 micron Aloxite discs, composed of aluminum oxide, until flow ceased. Thereafter, four treatment fluids comprising 1.25 sg NaBr brine buffered at approximately pH 5.2 alone or comprising the permeability modifier deactivators described herein were prepared. Each was flowed at 100 psi and 40° C. (104° F.) and timed until 200 g of fluid was collected through the Aloxite disc. The treatment fluid composition and results are shown in Table 1 and demonstrate that the permeability modifier deactivators in some embodiments described herein are effective at restoring reduced permeability caused by the permeability modifiers disclosed herein. For comparison, a control sample was run on an untreated Aloxite disc and it took 6 seconds to collect 200 g of the 1.25 sg NaBr brine buffered at approximately pH 5.2.

TABLE 1

| Treatment Fluid Composition | Time (sec) to reach 200 g fluid flow collection |
|---|---|
| Brine alone | 1800 |
| 20% EGMBE in brine | 24 |
| 2% betain at pH 8.6 in brine | 480 |
| 2% betain at pH 2.1 | 2100 |

EXAMPLE 4

In this example, the ability of a surfactant for use as the permeability modifier deactivators to restore water permeability that has been reduced by the permeability modifiers in some embodiments described herein was evaluated by measuring the fluid loss control ability of a water-soluble hydrophobically modified permeability modifier in the presence of an anionic surfactant. A control experiment was initially performed to determine the water permeability reducing ability of a water-soluble hydrophobically modified dimethylaminoethyl methacrylate permeability modifier solution by contacting a silica flour bed with the permeability modifier and determining the fluid loss control. The permeability modifier solution was prepared using 67 gallons of the permeability modifier per thousand gallons of solution, corresponding to a 0.2% permeability modifier concentration in 2% KCl. The fluid loss control tests were performed by measuring the flow rates of the permeability modifier solution followed by 2% KCl solution through a silica flour filter cake prepared by deposition of 10 grams of silica flour mixed in water onto filter paper placed over the bottom lid in a Filter Press HPHT fluid loss cell with a capacity of 175 ml supplied by Fann Instruments in Houston, Tex. The 2% KCl or permeability modifier solution was then poured onto top of the filter cake, and the flow rate was measured over a 10 minute period by applying a pressure of 30 psi. 100 ml of the permeability modifier solution was poured on the filter bed, and the flow rate was measured. A flow rate reduction of about 50% or more is assumed to be indicative of the permeability modifier's ability to reduce water permeability and is given a "pass" rating.

Figure 2:
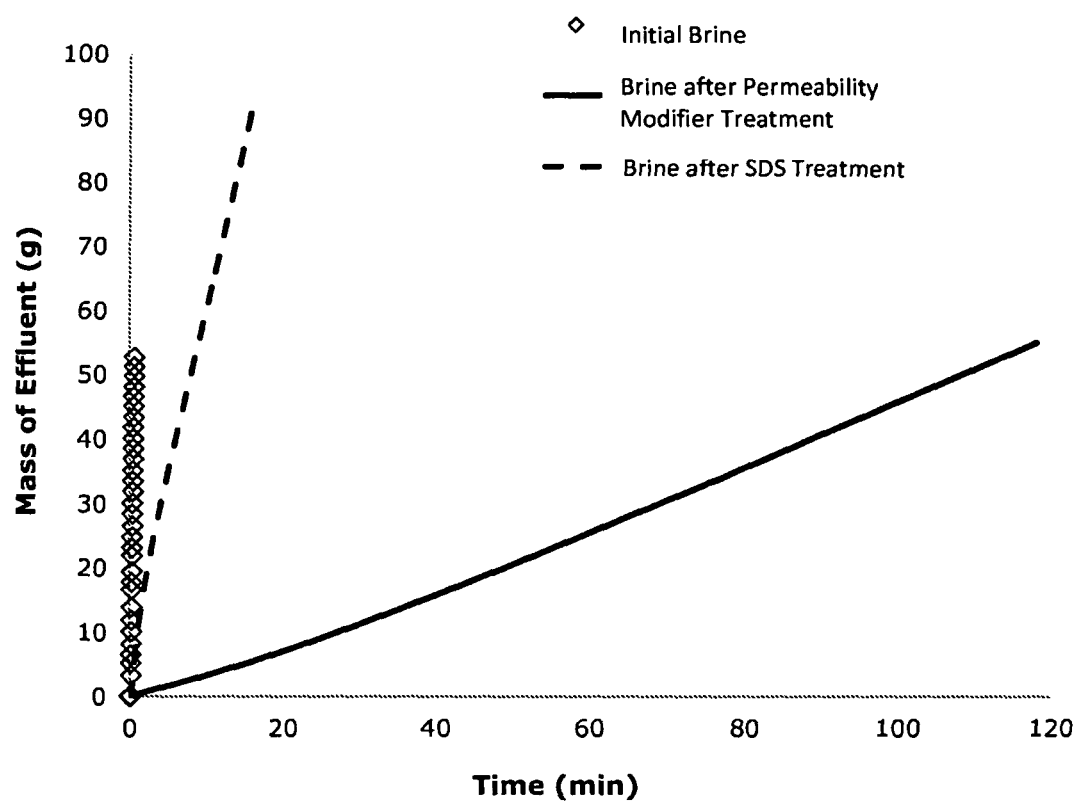
FIG. 2 shows a graphical representation of a fluid loss control test demonstrating the ability of a surfactant to be used as a permeability modifier deactivator as disclosed in some embodiments herein.

When the flow rate of permeability modifier solution was reduced significantly, indicating reduced water permeability, the remaining permeability modifier solution was poured out, and replaced with 100 ml of the 2% KCl solution. The apparatus was reassembled and the flow rates were measured. When the flow rate stabilized, the 2% KCl was replaced with 100 ml of 1.3% sodium dodecyl sulfate anionic surfactant (permeability modifier deactivator) solution. The apparatus was reassembled and the flow rate measurement was resumed. The flow rate increased quickly. After flowing the entire volume of the surfactant solution, the apparatus was recharged with 100 ml of the 2% KCl solution, and flow rate measurement was resumed. The flow rates were close to that measured for the 2% KCl solution prior to treatment with the permeability modifier, indicating that the permeability reduction effect of the permeability modifier was nullified by treatment with the surfactant solution, thereby restoring the original permeability of the silica flour bed. FIG. 2 shows a graphic representation of the results.

Therefore, the embodiments herein are well adapted to attain the ends and advantages mentioned as well as those that are inherent therein. The particular embodiments disclosed above are illustrative only, as the embodiments herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
 (a) providing a treatment fluid comprising an aqueous base fluid, an acid, a permeability modifier, and a permeability modifier deactivator,
 wherein the permeability modifier deactivator is present in an amount in the range of from 0.001% to about 200% by weight of the permeability modifier;
 (b) providing an injection well in a subterranean formation having a first treatment zone comprising a first aqueous formation permeability, wherein the first treatment zone comprises formation damage;

(c) introducing the treatment fluid into the injection well, so as to contact the acid, the permeability modifier, and the permeability modifier deactivator with the first treatment zone;

(d) reacting the acid with the first treatment zone so as to repair a portion of the formation damage;

(e) reacting the permeability modifier with the first treatment zone so as to cause the first aqueous formation permeability in the first treatment zone to adopt a second aqueous formation permeability that is less than the first aqueous formation permeability;

(f) contacting the permeability modifier deactivator with the permeability modifier at the first treatment zone so as to deactivate the permeability modifier and restore the first treatment zone to at least about 20% of the first aqueous formation permeability, wherein the permeability modifier deactivator blocks hydrophobic functional groups present on the permeability modifier from forming intermolecular or intramolecular associations;

(g) removing the treatment fluid from the injection well; and (h) performing an operation in the injection well selected from the group consisting of a waterflood operation, a pressure maintenance operation, an enhanced oil recovery operation, and any combination thereof.

2. The method of claim 1, wherein elements (a) through (f) are repeated at least at a second treatment zone in the injection well.

3. The method of claim 1, wherein the second aqueous formation permeability is in the range of about 50% to about 90% less than the first aqueous formation permeability.

4. The method of claim 1, wherein the permeability modifier deactivator deactivates the permeability modifier by an additional mechanism selected from the group consisting of desorption of the permeability modifier; degradation of the permeability modifier; and any combination thereof.

5. The method of claim 1, wherein the permeability modifier is an unmodified water-soluble polymer; a water-soluble hydrophobically modified polymer; a water-soluble hydrophilically modified polymer; and any combination thereof.

6. The method of claim 1, wherein the permeability modifier is present in an amount in the range of from about 0.05% to about 5% by weight of the treatment fluid.

7. The method of claim 1, wherein the acid is present in an amount in the range of from about 0.5% to about 8% by weight of the treatment fluid.

8. The method of claim 1, wherein the permeability modifier deactivator is selected from the group consisting of a free-radical generating compound; a mutual solvent; a surfactant; and any combination thereof.

9. A method comprising:

(a) providing a first treatment fluid composing an aqueous base fluid, an acid, and a permeability modifier;

(b) providing a second treatment fluid comprising an aqueous base fluid and a permeability modifier deactivator, wherein the permeability modifier deactivator is present in an amount in the range of from about 0.001% to about 200% by weight of the permeability modifier;

(c) providing an injection well in a subterranean formation having a first treatment zone comprising a first aqueous formation permeability, wherein the first treatment zone comprises formation damage;

(d) introducing the first treatment fluid into the injection well, so as to contact the acid and the permeability modifier with the first treatment zone;

(e) reacting the acid with the first treatment zone so as to repair a portion of the formation damage;

(f) reacting the permeability modifier with the first treatment zone so as to cause the first aqueous formation permeability in the first treatment zone to adopt a second aqueous formation permeability that is less than the first aqueous formation permeability;

(g) introducing, the second treatment fluid into the injection well, so as to contact the permeability modifier deactivator with the first treatment zone;

(h) contacting the permeability modifier deactivator with the permeability modifier at the first treatment zone so as to deactivate the permeability modifier and restore the first treatment zone to at least about 20% of the first aqueous formation permeability, wherein the permeability modifier deactivator blocks hydrophobic functional groups present on the permeability modifier from forming intermolecular or intramolecular associations;

(i) removing the treatment fluid from the infection well; and (j) performing an operation in the injection well selected from the group consisting of a waterflood operation, a pressure maintenance operation, an enhanced oil recovery operation, and any combination thereof.

10. The method of claim 9, wherein elements (a) through (h) are repeated at at least a second treatment zone in the injection well.

11. The method of claim 9, wherein the second aqueous formation permeability is in the range of about 50% to about 90% less than the first aqueous formation permeability.

12. The method of claim 9, wherein the permeability modifier deactivator deactivates the permeability modifier by an additional mechanism selected from the group consisting of desorption of the permeability modifier; degradation of the permeability modifier; and any combination thereof.

13. The method of claim 9, wherein the permeability modifier is an unmodified water-soluble polymer; a water-soluble hydrophobically modified polymer; a water-soluble hydrophilically modified polymer; and any combination thereof.

14. The method of claim 9, wherein the permeability modifier is present in an amount in the range of from about 0.05% to about 5% by weight of the treatment fluid.

15. The method of claim 9, wherein the acid is present in an amount in the range of from about 0.5% to about 8% by weight of the treatment fluid.

16. The method of claim 9, wherein the permeability modifier deactivator is selected from the group consisting of a free-radical generating compound; a mutual solvent; a surfactant; and any combination thereof.

* * * * *